United States Patent [19]
Sweeney

[11] Patent Number: 5,878,703
[45] Date of Patent: *Mar. 9, 1999

[54] TWO STROKE CYCLE ENGINE

[76] Inventor: Kevin Sweeney, 315 Carbon St., Fairview Heights, Ill. 62208

[*] Notice: This patent issued on a continued prosecution application filed under 37 CFR 1.53(d), and is subject to the twenty year patent term provisions of 35 U.S.C. 154(a)(2).

[21] Appl. No.: 865,863

[22] Filed: May 30, 1997

Related U.S. Application Data

[60] Provisional application No. 60/018,732 May 31, 1996.

[51] Int. Cl. [6] .................................................. F02B 75/22
[52] U.S. Cl. .............................. 123/65 BA; 123/184.24
[58] Field of Search ........................ 123/65 BA, 184.24, 123/184.34, 184.47

[56] References Cited

U.S. PATENT DOCUMENTS

| | | | |
|---|---|---|---|
| 3,036,561 | 5/1962 | Berchtold | 123/65 BA |
| 3,540,421 | 11/1970 | Boyce et al. | 123/65 BA |
| 3,680,305 | 8/1972 | Miller | 123/65 BA |
| 4,162,662 | 7/1979 | Melchior | 123/65 VD |
| 4,399,778 | 8/1983 | Ancheta | 123/65 VB |
| 4,480,968 | 11/1984 | Duerr | 417/380 |
| 4,539,948 | 9/1985 | Toepel | 123/65 BA |
| 4,781,028 | 11/1988 | Zoche | 60/612 |
| 4,860,699 | 8/1989 | Rocklein | 123/26 |
| 4,864,979 | 9/1989 | Eickmann | 123/65 BA |
| 4,995,349 | 2/1991 | Tuckey | 123/65 VB |
| 5,005,537 | 4/1991 | Maissant | 123/65 VB |
| 5,088,285 | 2/1992 | Stevenson | 60/605.1 |
| 5,101,794 | 4/1992 | Van Blaricom | 123/65 BA |
| 5,239,950 | 8/1993 | Takahashi | 123/65 BA |
| 5,251,581 | 10/1993 | Takahashi et al. | 123/65 P |
| 5,307,792 | 5/1994 | Takahashi et al. | 123/65 A |
| 5,370,087 | 12/1994 | Guimond et al. | 123/546 |
| 5,419,289 | 5/1995 | Duret et al. | 123/73 B |
| 5,448,971 | 9/1995 | Blundell et al. | 123/65 VB |

OTHER PUBLICATIONS

Sport Aviation, Oct. 1995, p. 39.
Product Information Sheet, "Universal V–4 Aero Diesel," Aug., 1995, 1 page.

*Primary Examiner*—David A. Okonsky
*Attorney, Agent, or Firm*—Senniger, Powers, Leavitt & Roedel

[57] ABSTRACT

An improved two stroke cycle engine is disclosed. The engine has an intake port for passing air into a cylinder of the engine and has a piston within the cylinder for reciprocal movement between a top dead center position and a bottom dead center position. The engine includes a crankcase, an intake valve in a wall of the crankcase, a plenum chamber for supplying air to the intake port and an output valve positioned between the crankcase and the plenum chamber. The engine also includes an air compressor and an air compressor valve positioned between the air compressor and the plenum chamber. The engine has a first mode of operation during startup wherein the piston draws air into the crankcase through the intake valve and then forces air from the crankcase, through the output valve, into the plenum chamber and to the intake port. The engine has a second mode of operation during which the engine is running wherein the air compressor forces air through the air compressor valve, into the plenum chamber and to the intake port. A two stroke cycle engine having a plurality of cylinders, cylinder heads and the upper portion of the crankcase formed from the same material is also disclosed. Other kits and methods of practicing the invention are also disclosed.

15 Claims, 7 Drawing Sheets

TWO STROKE CYCLE ENGINE

This application is a continuation-in-part of copending Provisional Application No. 60/018,732, filed May 31, 1996.

BACKGROUND OF THE INVENTION

Designs for turbocharged two stroke cycle internal combustion engines have been known for a long time. The turbocharger is used to draw in outside air and pressurize it to a desired pressure. The pressurized air is then supplied to the intake ports of the cylinders in the engine. When the piston in a cylinder is near the bottom of its stroke, the intake ports are open which allow the pressurized air to enter the cylinder and push exhaust gas out of the cylinder. Fresh air is left behind in the cylinder for the next combustion cycle. After the piston begins its upward movement, a fuel injector injects fuel into the top of the cylinder.

A drawback of prior two stroke cycle engine designs becomes apparent when one tries to start them. Since the turbocharger uses the exhaust gas from the engine for its source of power and since there is no appreciable exhaust gas during startup, the turbocharger lacks the exhaust gas needed to operate efficiently and so there is no pressurized air available at the intake ports of the cylinders during startup.

Common solutions to this startup problem have included "Roots blowers" and other mechanical superchargers and scavenge pumps which are mechanically coupled to the crankshaft of the engine. The rotational movement of the crankshaft by the starter motor drives the Roots blower, supercharger or pump which then provides the startup air pressure to get the two stroke cycle engine started. Once started, the turbocharger receives the exhaust gas needed to become operational and the turbocharger thereafter supplies most of the compressed air for normal operation of the engine.

As noted, however, such a design requires a fairly complicated blower, supercharger or pump which has a substantial cost. Further, when the engine is for use in boats or airplanes, the additional weight of the blower, supercharger or pump is particularly undesirable.

Another drawback of conventional designs for two stroke cycle engines is that they include separate cylinder heads, separate cylinder walls, and/or a separate crankcase. Each of the separate components must be joined together with suitable fasteners, such as bolts, which add significant weight to the engine design. At each joint between components, a gasket is often used to prevent leaks. The gasket is sandwiched between opposing faces which are drawn tightly together. To insure a good seal, the opposing faces are typically thicker than adjoining materials. The increased thickness of the opposing faces adds further weight to the design.

Accordingly, there is a need for a lightweight, high output two stroke cycle turbocharged engine which starts reliably without use of heavy mechanical blowers.

SUMMERY OF THE INVENTION

Among the objects of the present invention are to provide an improved method and apparatus for a two stroke cycle internal combustion engine; to provide such improved method and apparatus which is relatively light in weight and has relatively high output power; to provide such improved method and apparatus which starts reliably without need for an external mechanical blower, supercharger or pump; to provide such improved method and apparatus which operates efficiently and can be manufactured at low cost; and to provide such improved method and apparatus which has the cylinder head, cylinder wall and upper portion of the crankcase integrally formed from the same material.

In one embodiment, the invention comprises a two stroke cycle engine having an intake port for passing air into a cylinder of the engine. The engine includes a piston within the cylinder for reciprocal movement between a top dead center position and a bottom dead center position. The engine also includes a crankcase, an intake valve in a wall of the crankcase, a plenum chamber for supplying air to the intake port and an output valve between the crankcase and the plenum chamber. The engine also has an air compressor and an air compressor valve between the air compressor and the plenum chamber. The engine has a first mode of operation during startup wherein the piston draws air into the crankcase through the intake valve as the piston moves towards its top dead center position and wherein the piston forces air from the crankcase, through the output valve, into the plenum chamber and to the intake port as the piston moves towards its bottom dead center postion. The engine has a second mode of operation during which the engine is running wherein the air compressor forces air through the air compressor valve, into the plenum chamber and to the intake port.

In another embodiment, the invention comprises a kit for retrofitting a two stroke cycle engine to allow the engine to startup without use of a startup air compressor. The engine includes an intake port for passing air into a cylinder of the engine and a piston within the cylinder for reciprocal movement between a top dead center position and a bottom dead center position. The engine further includes a run-time air compressor and a plenum chamber for supplying air from the air compressor to the intake port. The engine also has a crankcase. The kit includes an intake valve adapted for use in a wall of the crankcase to allow air to pass into the crankcase during startup of the engine as the piston moves towards its top dead center position. The kit also includes an output valve adapted for use between the crankcase and the plenum chamber to allow air to pass from the crankcase into the plenum chamber during startup of the engine as the piston moves towards its bottom dead center position. The kit also includes an air compressor valve adapted for use between the run-time air compressor and the plenum chamber to allow air to pass from the run-time air compressor into the plenum chamber while the engine is running.

In yet another embodiment, the invention comprises a two stroke cycle engine having a plurality of cylinder assemblies. Each cylinder assembly has a cylinder and a cylinder head. The engine includes a removable fastener and a crankcase having an upper portion and a lower portion. The lower portion of the crankcase is secured to the upper portion with the removable fastener. The cylinder assemblies are directly connected to the upper portion of the crankcase. The upper portion of the crankcase fits against the lower portion of the crankcase in approximately a same plane and the cylinders, cylinder heads and upper portion of the crankcase are all integrally formed from a same material.

In yet another embodiment, the invention comprises a two stroke cycle engine having an intake port for passing air into a cylinder of the engine and a piston within the cylinder for reciprocal movement between a top dead center position and a bottom dead center position. The engine includes a crankcase, a one way intake valve in a wall of the crankcase, a plenum chamber for supplying air to the intake port and a one way output valve between the crankcase and the plenum chamber. The engine also includes an air compressor and a one way air compressor valve between the air compressor and the plenum chamber.

In yet still another embodiment, the invention comprises a method of retrofitting a two stroke cycle engine to allow the engine to startup without use of a startup air compressor. The engine has an intake port for passing air into a cylinder of the engine and has a piston within the cylinder for reciprocal movement between a top dead center position and a bottom dead center position. The engine further has a run-time air compressor and a plenum chamber for supplying air from the air compressor to the intake port. The engine also has a crankcase. The method includes the step of providing an intake valve in a wall of the crankcase to allow air to pass into the crankcase during startup of the engine as the piston moves towards its top dead center position. The method also includes the step of providing an output valve between the crankcase and the plenum chamber to allow air to pass from the crankcase into the plenum chamber during startup of the engine as the piston moves towards its bottom dead center position. The method also includes the step of providing an air compressor valve between the run-time air compressor and the plenum chamber to allow air to pass from the run-time air compressor into the plenum chamber while the engine is running.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
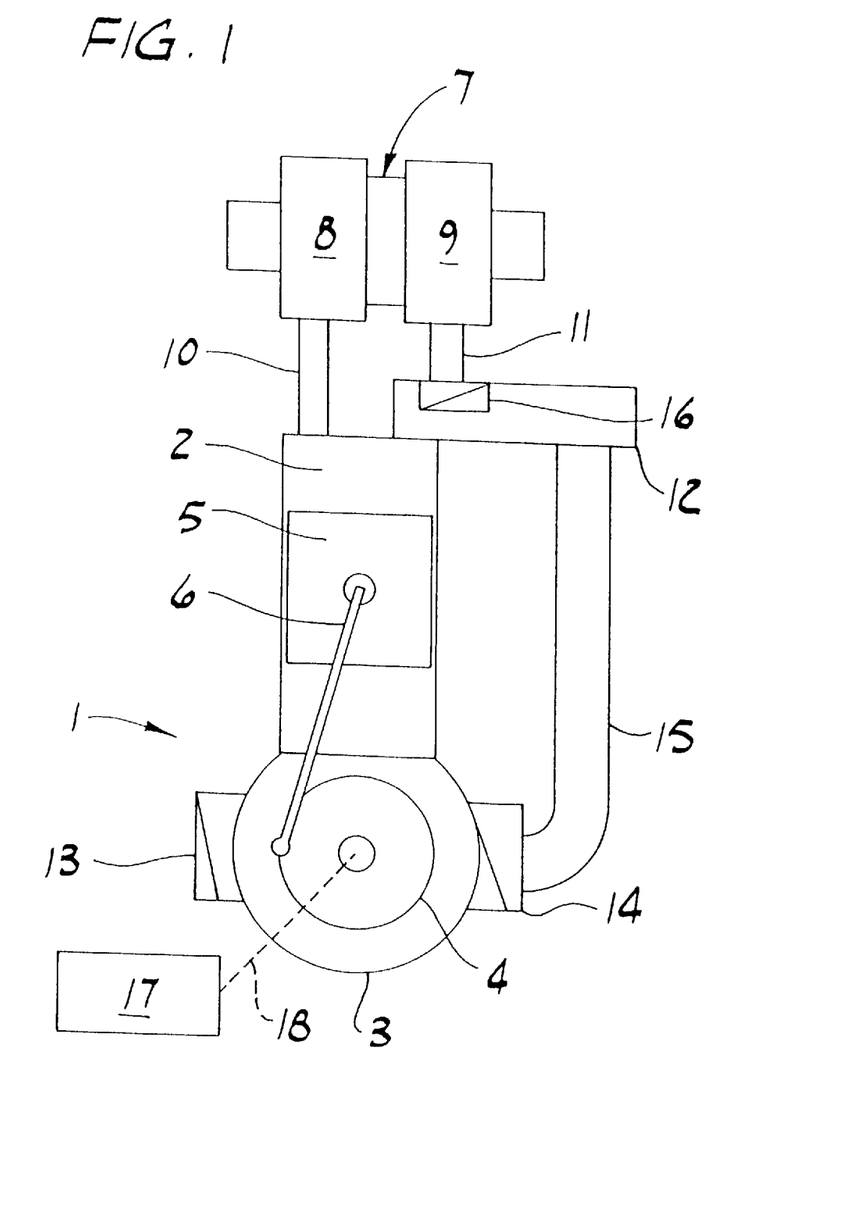
FIG. 1 shows a schematic diagram of a two stroke cycle engine of the present invention.

FIG. 1 shows a schematic of a two stroke cycle engine 1 of the present invention. Engine 1 is shown as having a single cylinder 2 for clarity in explaining the principles of operation of engine 1. Certainly engine 1 could employ any number of cylinders within the scope of the invention.

Engine 1 includes a crankcase 3 which supports a crankshaft 4. A piston 5 is connected to crankshaft 4 via a conventional connecting rod 6. As crankshaft 4 rotates, piston 5 reciprocates in cylinder 2.

Engine 1 also includes an exhaust gas turbocharger 7 comprising a turbine 8 and a compressor 9. The turbine 8 of turbocharger 7 receives the exhaust gas from engine 1 through an exhaust gas pipe 10 to power turbocharger 7. The compressor 9 draws in outside air and pressurizes it to a desired pressure. The pressurized air is supplied to the intake ports of engine 1 through a compressor discharge pipe 11, a compressor discharge valve 16 and an air receiver plenum 12. Air receiver plenum 12 directs the pressurized air to the intake ports (not shown) of engine 1. As schematically shown in FIG. 1, plenum 12 is connected near the top of cylinder 2 near where intake valves are commonly located. Alternatively, for a piston ported engine having intake ports midway down the cylinder, plenum 12 would be connected adjacent the intake ports.

Engine 1 also includes a crankcase inlet valve 13 and a crankcase discharge valve 14, both of which are connected to the crankcase 3. A crankcase discharge pipe 15 connects discharge valve 14 to plenum 12. A starter motor 17 is coupled to crankshaft 4 via a mechanical connection 18 for rotating crankshaft 4 during startup. Starter motor 17 may be any suitable electric, hydraulic, pneumatic, mechanical or other type starter motor for use in rotating crankshaft 4 at its proper speed during startup.

Prior to startup when engine 1 is at rest and piston 5 is at the top dead center ("TDC") position, the crankcase inlet valve 13 is closed, the compressor discharge valve 16 is closed, and the crankcase discharge valve 14 is open. Further, the air pressure inside of crankcase 3 is at ambient conditions and turbocharger 7 is at rest and inoperative.

During startup, starter motor 17 rotates crankshaft 4 which moves piston 5 in cylinder 2 causing the compression of the air in crankcase 3. This compressed air is at a higher pressure than ambient pressure and so forces its way through crankcase discharge valve 14, through discharge pipe 15 and into air plenum 12 and hence to the intake ports of engine 1. Because compressor discharge valve 16 is closed, no air from the crankcase 3 is allowed into compressor 9 during startup.

When piston 5 reaches its bottom dead center ("BDC") position, no further compression of the air in crankcase 3 can occur. At this time, crankcase discharge valve 14 closes and, as piston 5 begins its upward travel in cylinder 2, crankcase inlet valve 13 opens. Compressor discharge valve 16 remains closed.

As piston 5 moves toward its TDC position, the volume in crankcase 3 is increased and a lower than ambient pressure is created inside of crankcase 3. This lower pressure causes outside air to be drawn into crankcase 3 through crankcase inlet valve 13 as the pressure inside of crankcase 3 attempts to equalize to ambient.

When piston 5 reaches its TDC position, crankcase inlet valve 13 closes and, as piston 5 begins its downward travel in cylinder 2, crankcase discharge valve 14 opens and the cycle begins again.

At the same time that valves 13 and 14 are opening and closing during startup as above, the air inside cylinder 2 is being compressed during the travel of piston 5 from the BDC position to the TDC position. Fuel, such as diesel fuel, gasoline or kerosene, is added to the air being admitted into cylinder 2, either before or after compression in cylinder 2 begins. When and how the fuel is added is determined by whether the engine is of the spark ignition or compression ignition type. Ignition of the air/fuel mixture occurs when piston 5 is near its TDC position.

As piston 5 nears its BDC position, the exhaust gas from engine 1 is transmitted through exhaust gas pipe 10 to turbine 8 of turbocharger 7. This in turn causes turbocharger 7 to begin operation. These startup processes are repeated until engine 1 starts. Starter 17 is disengaged when the power produced by engine 1 is sufficient for self-sustained running.

As turbocharger 7 rises up to a normal speed of operation, the output pressure from compressor 9 rises until it exceeds the pressure of the air in air plenum 12 as supplied by crankcase 3 via crankcase discharge valve 14 and discharge pipe 15. This rise in pressure from compressor 9 above the pressure in air plenum 12 causes compressor discharge valve 16 to open and crankcase discharge valve 14 to close. The positive pressure which thereafter builds up in crankcase 3 keeps crankcase inlet valve 13 closed. Engine 1 is then running on compressed air from turbocharger 7.

Accordingly, as shown in FIG. 1, air flow through crankcase inlet valve 13, crankcase discharge valve 14 and the compressor discharge valve 16 is all substantially in the same direction toward the intake ports of engine 1. Valves 13, 14 and 16 are preferably self-activating differential pressure type valves, such as commonly found reed valves or light spring one way valves.

Figure 2:
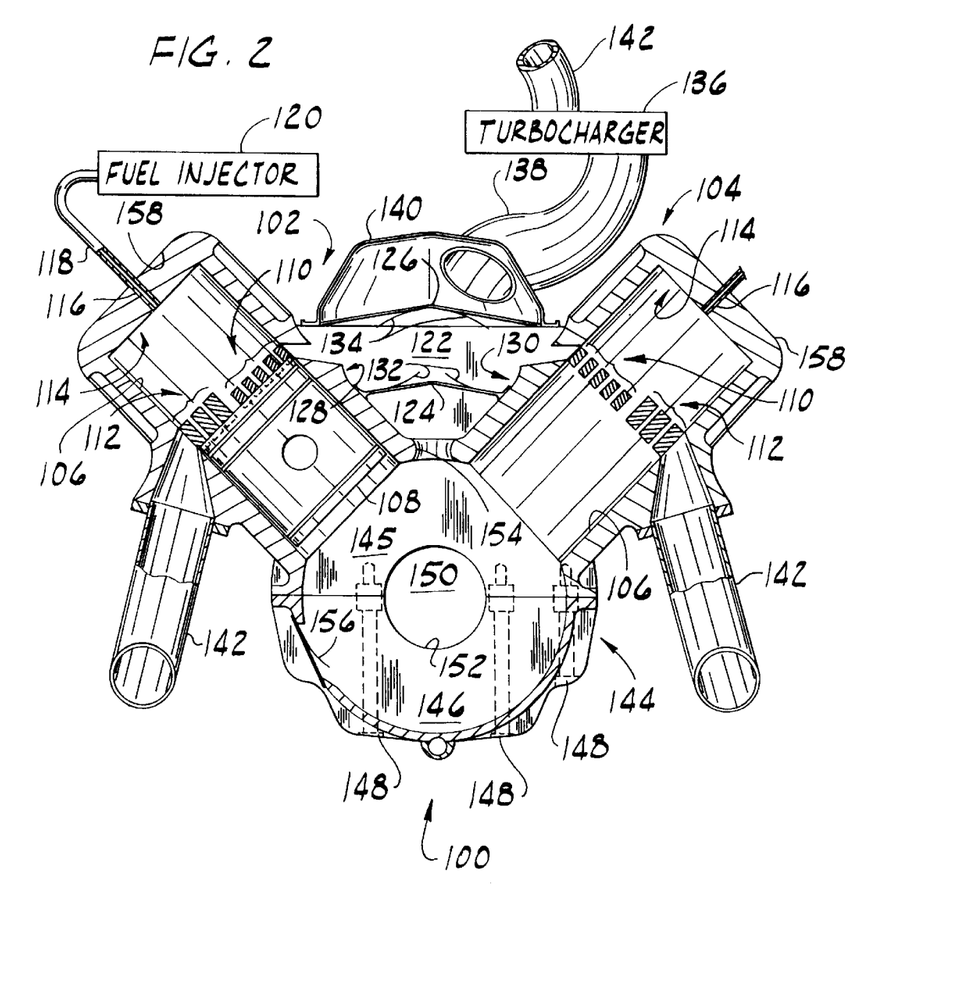
FIG. 2 shows a partially cut away front view of a two stroke cycle engine of the present invention.

FIG. 2 shows a two stroke cycle, piston ported engine 100 of the present invention. Engine 100 includes a cylinder assembly 102 and a cylinder assembly 104 in a V design. The angle subtended between the cylinder assemblies 102, 104 is preferably 45 degrees. Other angles can also be used within the scope of the invention. Cylinder assembly 102 includes a cylinder 106 which defines the path of a piston 108 (connecting rod not shown for clarity) as piston 108 reciprocates in cylinder 106 during normal operation of engine 100. Cylinder 106 preferably includes a replaceable sleeve of known construction which is pressed into cylinder 106 for extending the useful life of engine 100.

Cylinder 106 includes a plurality of intake ports 110 and a plurality of exhaust ports 112. When piston 108 is in its BDC position, the top of the piston should be positioned near the bottom of ports 110 and 112. As piston 108 moves up from its BDC position, it closes intake ports 110 first and then it closes exhaust ports 112 thereafter. The piston continues its upward travel until it reaches its TDC position adjacent a cylinder head 114. A fuel injection tip 116 is positioned through cylinder head 114. A line 118 connects a fuel injector 120 to tip 116 for injecting fuel into the cylinder. This fuel injection system is of known construction and will not be described further. If an ignition system is to be used with engine 100, a spark plug (not shown) or other igniting device will also be positioned in cylinder head 114.

Engine 100 also includes a plenum chamber 122 defined by a lower support member 124 at the bottom, an upper support member 126 at the top, external surfaces 128 and 130 of cylinders 102 and 104 (and any other cylinders that may be used), respectively, along the sides, and a front and back panel (not shown) for enclosing chamber 122 at the front and back. Lower support member 124 includes a number of valves 132 therethrough. Upper support member 126 includes a number of valves 134 therethrough.

In practice, valves 132 and 134 (like valves 13, 14 and 16 in FIG. 1) are preferably one way valves, such as commonly found reed valves, which can be fabricated from composite materials such as fibreglass or carbon fibre materials. Stainless steel can also be used in fabricating valves 132 and 134; however, in the event of a valve failure, stainless steel valves are likely to cause far more damage to engine 100 than, for example, fiberglass valves.

In order to maximize the area in lower and upper support members 124 and 126 through which the valves 132 and 134, respectively, are active, it has been found preferable to install a number of valves positioned side by side in rows along both of these support members. The exact layout of the valves is determined, in part, by the available space in lower and upper support members 124 and 126. The layout is not critical so long as the distribution of air from plenum chamber 122 to the cylinders is fairly uniform.

Plenum chamber 122 communicates with each of the cylinders in engine 100 via intake ports 110. For example, when the top of piston 108 moves below the top of intake ports 110, the ports open and air from plenum chamber 122 flows into cylinder 106.

Engine 100 also includes a turbocharger 136 which communicates with plenum chamber 122 via a hose 138 and a housing 140. The compressed air produced by turbocharger 136 thus passes through hose 138, into housing 140, through valves 134 and into plenum chamber 122. As intake ports 110 open, the compressed air from turbocharger 136 then passes from plenum chamber 122 into cylinders 106. An exhaust line 142 receives the exhaust gas from cylinders 106 via exhaust ports 112 and conveys the exhaust gas to turbocharger 142 for powering the turbocharger. The actual piece of exhaust line running between the portion of exhaust line 142 at the exhaust ports 112 and the portion of exhaust line 142 at turbocharger 136 is not shown in FIG. 2 for clarity. The routing of the exhaust line to tune the exhaust and provide for the proper operation of turbocharger 136 varies according to the number and layout of cylinders in engine 100 as understood by those skilled in the art and will not be discussed further.

Engine 100 also includes a crankcase 144 having an upper portion 145 and a lower portion 146. Suitable fasteners such as bolts 148 are used to secure lower portion 146 to upper portion 148, thereby capturing a crankshaft 150 within a main bearing 152 therebetween. Main bearing 152 is preferably a sleeve bearing machined to a tolerance sufficient to prevent any substantial air leakage between bearing 152 and crankshaft 150. Roller bearings or other bearings may also be used in place of sleeve bearings within the scope of the invention so long as a seal (not shown) is positioned adjacent the bearing to prevent any substantial leakage of air through the bearing.

Crankcase 144 includes an orifice 154 between cylinder assemblies 102 and 104. As air pressure builds within crankcase 144 during startup of engine 100, the air flows from crankcase 144, through orifice 154, through valves 132 and into plenum chamber 122. Crankcase 144 also includes a plurality of valves 156. Valves 156 are of similar construction as valves 132 and 134 described above. When the pressure in crankcase 144 drops below atmospheric pressure during startup of engine 100, outside air is drawn through valves 156 and into crankcase 144. Valves 156 preferably comprise a plurality of valves to increase the available area through which air can flow. The layout of valves 156 is determined by the geometry and available space in crankcase 144.

As seen in FIG. 2, cylinder head 114, cylinders 106 and the upper portion 145 of crankcase 144 are all integrally formed from the same material, preferably by casting all of these components in the same mold. By making each of these components in one piece, a substantial weight savings is realized since there is no need for any heavy bolts to hold the components together, no need for gaskets to seal the spaces between the components, and no need for broader (and heavier) facings between components which are otherwise typically used to trap and compress the gasket. Indeed, a prototype of the present invention has been constructed with four cylinders in a 45 degree V formation which produces about 200 horsepower and weighs only about 220 pounds. Further refinements in the casting and other components are expected to achieve an even greater power to weight ratio within the scope of the present invention.

A water jacket 158 surrounds each of cylinders 106 for containing a coolant fluid between jacket 158 and cylinder 106 to cool the cylinder. A water pump (not shown) is used to circulate the coolant fluid and cool engine 100. In practice, it has been found useful to position the intake port in water jacket 158 (for receiving the coolant fluid from the water pump) just above the position where exhaust line 142 leads away from each cylinder 106. Since this exhaust area tends to be the hottest, positioning the intake port for the coolant just above this area tends to prevent overheating. Water jacket 158 is preferably fabricated, such as by molding, in one piece with cylinder head 114, cylinders 106 and the upper portion 145 of crankcase 144.

During startup of engine 100, as piston 108 moves from its TDC position towards its BDC position, the air pressure in crankcase 144 will rise above ambient pressure which will close valves 156, will open valves 132, and will leave valves 134 closed (for lack of exhaust gas to turbocharger 136 during startup). As piston 108 thereafter moves from its BDC position towards its TDC position, the air pressure in crankcase 144 will fall below ambient pressure which will open valves 156 drawing air into crankcase 144, will close valves 132, and will leave valves 134 closed (again, for lack of exhaust gas to turbocharger 136 during startup).

As startup progresses and engine 100 begins producing exhaust gas, turbocharger 136 becomes operational and begins producings output air pressure which is supplied to plenum chamber 122 via hose 138 and valves 134. As startup is completed, the air pressure from turbocharger 136 exceeds the air pressure in plenum chamber 122 produced by crankcase 144 and supplied via valves 132 so that valves 132 close, as do valves 156. Engine 100 is now running on pressurized air supplied by turbocharger 136.

Figure 3:
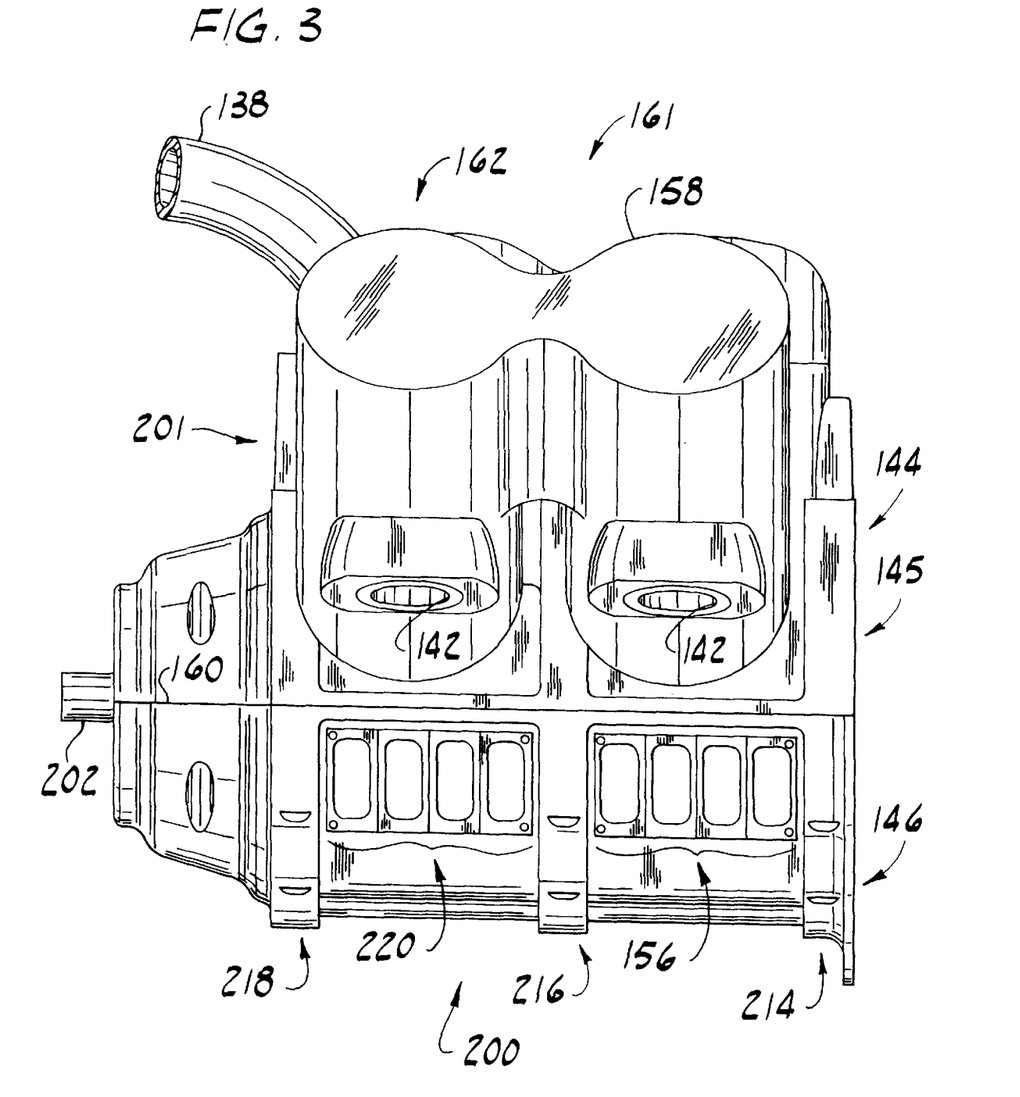
FIG. 3 shows a side view of a two stroke cycle engine of the present invention.

FIG. 3 shows a side view of an engine 200 constructed with four cylinders in a V formation. Of course, engine 200 could well have a greater or lesser number of cylinders within the scope of the present invention, and four cylinders are shown in FIG. 3 as only one example. Engine 200 has the same front view as engine 100 in FIG. 2. For comparison purposes, the two right most cylinders appearing in FIG. 3 have been marked with the same reference numerals as the two cylinder assemblies 102 and 104 in FIG. 2. As with engine 100 in FIG. 2, engine 200 in FIG. 3 has a crankcase 144 comprising an upper portion 145 (integrally formed with the cylinders) and has a lower portion 146 which is secured against upper portion 145 by suitable fasteners along a line 160.

The cylinders in engine 200 can be thought of as two pairs of cylinders, the right hand cylinder pair 161 (corresponding to cylinders 106 in FIG. 2) and the left hand cylinder pair 162. A plenum chamber indicated by general reference number 201 for use during startup as above is positioned inside the V formed between the cylinders.

Figure 4:
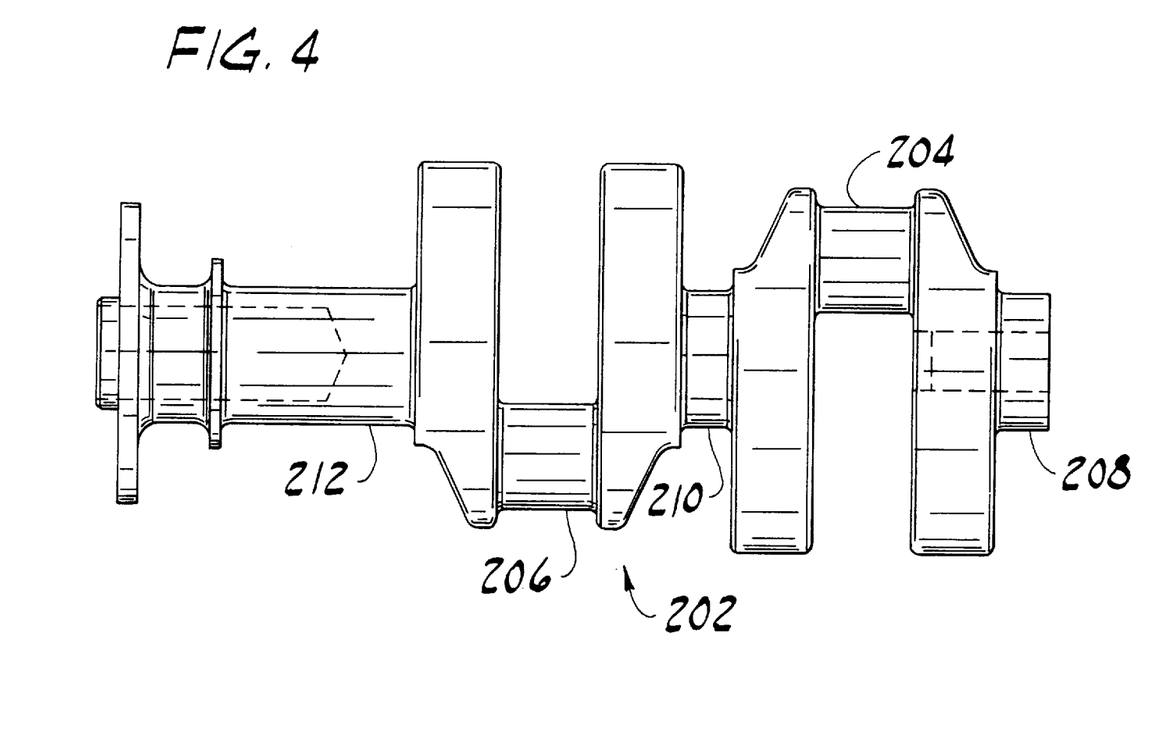
FIG. 4 shows the shape and throw positions for a crankshaft for use with the engine shown in FIG. 3.

FIG. 4 shows a diagram of the shape and throw positions for a crankshaft 202 for use with the engine 200 shown in FIG. 3. Crankshaft 202 includes a throw 204 to which is attached to the connecting rods from the pistons in the right hand cylinder pair 161. Crankshaft 202 includes a throw 206 to which is attached to the connecting rods from the pistons in the left hand cylinder pair 162. As shown, throws 204 and 206 are 180 degrees apart. Thus, when throw 204 is in its uppermost position, the pistons in right hand cylinder pair 161 are near their top dead center positions, throw 206 is in its lowermost position, and the pistons in left hand cylinder pair 162 are near their bottom dead center positions. Crankshaft 202 also includes bearing surfaces 208, 210 and 212 which, as explained below, are preferably supported within the main bearings of engine 200.

Returning to FIG. 3, when the lower portion 146 is secured against the upper portion 145 of crankcase 144, crankshaft 202 is sandwiched therebetween. Integrally formed within crankcase 144 are main bearing blocks 214, 216 and 218 which support the main bearings for securing crankshaft 202 at bearing surfaces 208, 210 and 212, respectively. Main bearing block 216 preferably divides the available volume inside crankcase 144 into two separate volumes with little leakage therebetween. Thus, in effect, right hand cylinder pair 161 has its own separate crankcase volume and left hand cylinder pair 162 has its own separate crankcase volume. As explained above, valves 156 access the crankcase volume associated with right hand cylinder pair 161. A plurality of valves 220 (of similar construction as valves 156) access the crankcase volume associated with left hand cylinder pair 162.

In designing the ports for the cylinders in engine 200, standard exhaust port design has been found to be effective. The intake ports are preferably designed using the principles of "Curtis Style Scavaging" with some modification. For example, when four intake ports are used along one side of a cylinder, the two middle intake ports should point radially inward and up toward the center of the top of the cylinder. The third intake port which is closest to the next cylinder should point radially inward but at a lower angle than the middle two ports. The fourth port on the other side of the middle two ports should point tangentially back along the cylinder wall and at a higher angle than the middle two ports. Of course, any workable design for the intake and exhaust ports can be used within the scope of the present invention.

Figure 5:
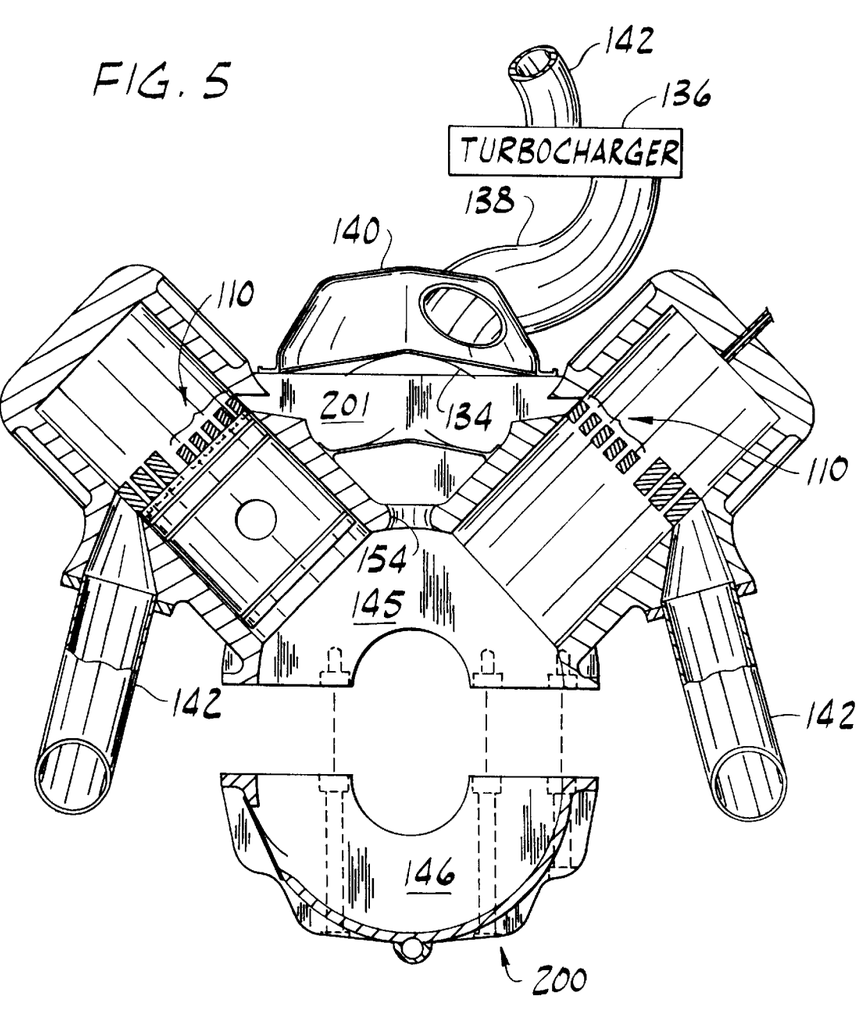
FIG. 5 shows a simplified front view of the two stroke cycle engine shown in FIG. 3 with the lower portion of the crankcase moved away from the rest of the engine.

FIG. 5 shows a simplified front view of the engine 200 shown in FIG. 3 except that the lower portion 146 of the crankcase 144 has been moved away from the rest of the engine. It is noted that engine 200 includes valves 134 in the path between hose 138 and plenum chamber 201. The function of valves 134 in FIG. 5 is the same as that for valves 134 described above in FIG. 2.

Figure 6:
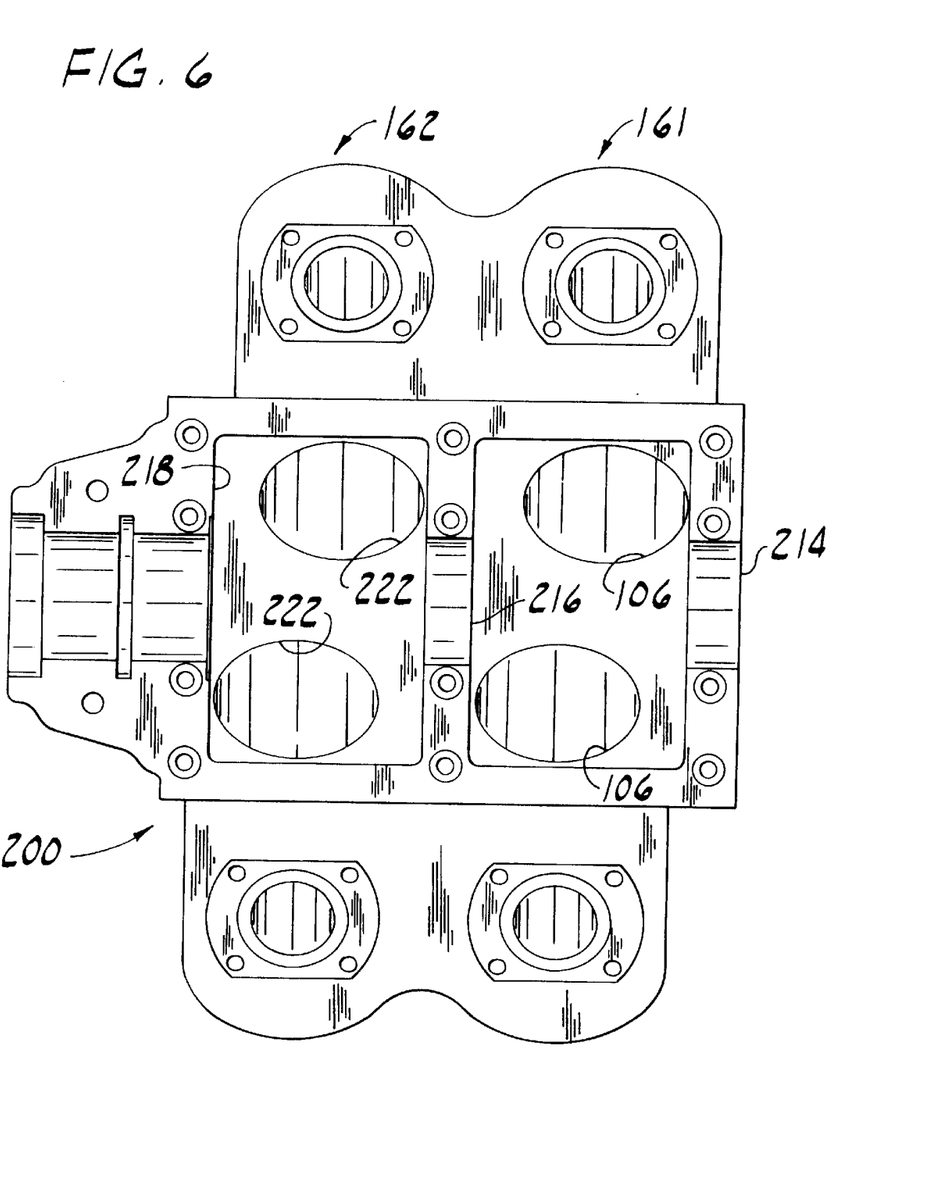
FIG. 6 shows a view looking up into the underside of the engine shown in FIG. 3 after the lower portion of the crankcase has been removed.

FIG. 6 shows a view looking up into the underside of the engine shown in FIG. 3 after the lower portion 146 of the crankcase 144 has been removed. Common reference numbers between FIGS. 3 and 6 are so marked.

FIG. 6 shows the importance of the cylinder positions with respect to the positions of the main bearing blocks 214, 216 and 218. As seen, the openings of cylinders 106 in right hand cylinder pair 161 as projected down into crankcase 144 must fall between main bearing blocks 214 and 216. Put another way, main bearing blocks 214 and 216 must not occlude the lower openings of cylinders 106. Similarly, left hand cylinder pair 162 includes a pair of cylinders 222. The openings of cylinders 222 as projected down into crankcase 144 must fall between main bearing blocks 216 and 218. Put another way, main bearing blocks 216 and 218 must not occlude the lower openings of cylinders 222. This requirement that the cylinders 106, 222 fall between the main bearing blocks 214, 216, 218 arises since the cylinder heads, cylinder walls and upper portion of the crankcase are all integrally formed from a single material and so the pistons must be loaded into the cylinders from the bottom. If the cylinder openings were partially blocked by the main bearing blocks, it would not be possible to load the pistons from the bottom.

FIG. 6 also shows how the cylinders in the right hand cylinder pair 161 are not positioned directly across from each other. The same is true for the cylinders in the left hand cylinder pair 162. The reason for this is that the pistons within these cylinders share the same throws on crankshaft 202. Thus, one cylinder must be slightly displaced along crankshaft 202 for both pistons in the cylinder pair to share the same throw. One way of eliminating this offset between the cylinders in a pair, and thus shortening the overall length of the engine and reducing its weight within the scope of the invention, would be to provide nested connecting rods for each pair of cylinders. Thus, at the point of attachment to the throw on crankshaft 202, the first connecting rod would have a fairly conventional shape while the second connecting rod in the cylinder pair would have a forked shape to fit around the attachment of the first connecting rod to the throw.

Figure 7:
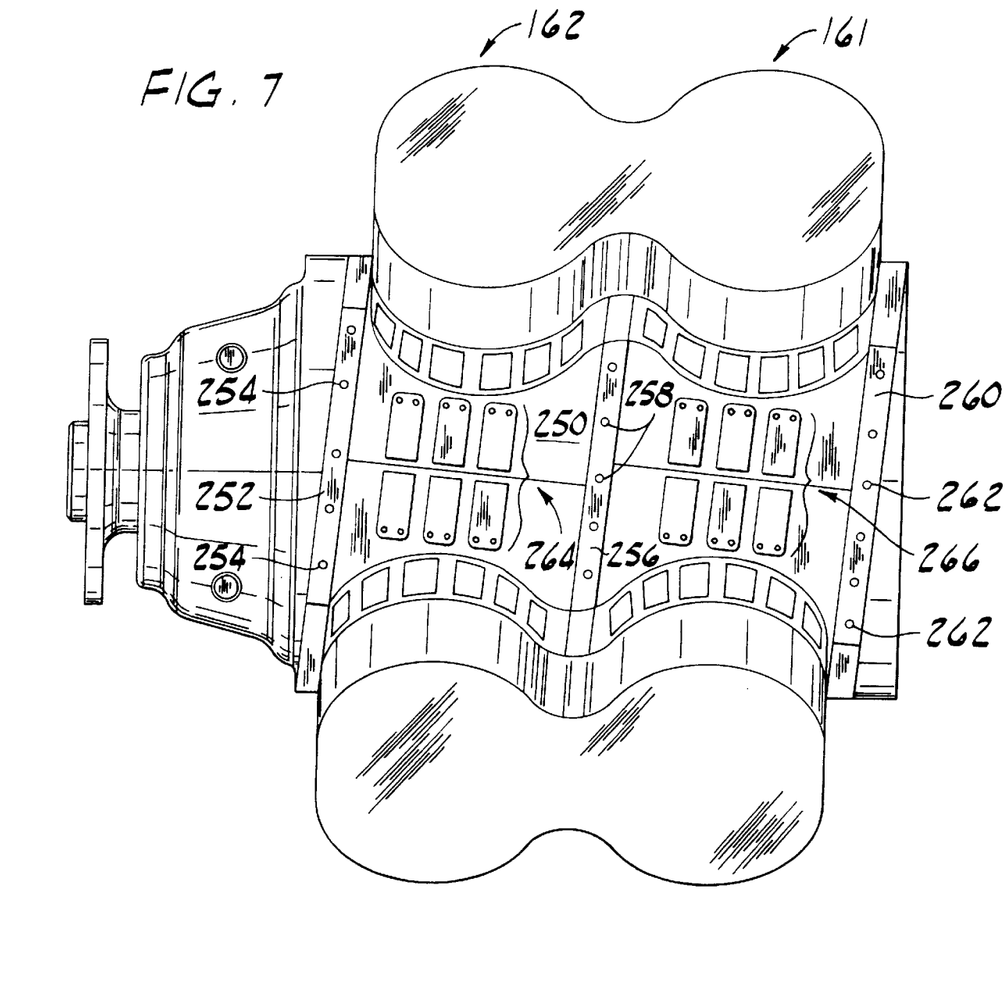
FIG. 7 shows a view looking down on the floor of the plenum chamber which is positioned between the cylinders of the engine shown in FIG. 3.

FIG. 7 shows a view looking down on the floor of the plenum chamber 201 which is positioned between the cylinders of the engine shown in FIG. 3. The floor of plenum chamber 201 includes a lower support member 250. Lower support member 250 includes a first section 252 which is secured by suitable fasteners 254 down onto the upper portion of the crankcase 145 (not shown in FIG. 7 but shown in FIG. 3) in the same plane as main bearing block 218 in FIG. 3. Lower support member 250 includes a second section 256 which is secured by suitable fasteners 258 down onto the upper portion of the crankcase 145 in FIG. 3 in the same plane as main bearing block 216 in FIG. 3. Lower support member 250 includes a third section 260 which is secured by suitable fasteners 262 down onto the upper portion of the crankcase 145 in FIG. 3 in the same plane as main bearing block 214 in FIG. 3.

Lower support member 250 also includes a plurality of valves 264 between sections 252 and 256, and a plurality of valves 266 between sections 256 and 260. It is thus seen that valves 266 are positioned in the path between the crankcase for right hand cylinder pair 161 and plenum chamber 201. It is also seen that valves 264 are positioned in the path between the crankcase for left hand cylinder pair 162 and plenum chamber 201.

In practice, if the valves 264, 266 are positioned immediately above the counterweights on the crankshaft and in line with orifice 154 (see FIG. 5), an oil control problem may occur. The problem is that the crankshaft counterweights will fling oil droplets through orifice 154 and onto valves 264 and 266 which may cause an accumulation of oil in plenum chamber 201. To avoid this problem, a suitable oil shield should be placed in the path between the counterweights and valves 264, 266. The shield should further allow for the movement of air past the shield at the sides so as not to block the flow of air from crankcase 144 into plenum chamber 201 during startup. A further alternative would be to position orifice 154 as an air passage in the main bearing blocks. This, again, would take valves 264, 266 out of the path of the oil droplets.

In use, the starting procedure for engine 200 shown in FIGS. 3 through 7 will now be explained. Since crankshaft 202 in FIG. 4 has a 180 degree spaced throw 204, 206 for each cylinder pair 161, 162, respectively, the pistons in right hand cylinder pair 161 will both be near their TDC position when the pistons in left hand cylinder pair 162 are both near their BDC position.

Thus, during startup, as the pistons in right hand cylinder pair 161 move from their TDC position towards their BDC position, the air pressure in their respective crankcase will rise above ambient pressure which will close valves 156 in FIG. 3, will open valves 266 in FIG. 7, and will leave valves 134 in FIG. 5 closed (for lack of exhaust gas to turbocharger 136 during startup). As the pistons in right hand cylinder pair 161 thereafter move towards their TDC position, the air pressure in their respective crankcase will fall below ambient pressure which will open valves 156 in FIG. 3 drawing air into the respective crankcase, will close valves 266 in FIG. 7, and will leave valves 134 in FIG. 5 closed (again, for lack of exhaust gas to turbocharger 136 during startup).

Similarly, during startup, as the pistons in left hand cylinder pair 162 move towards their BDC position, the air pressure in their respective crankcase will rise above ambient pressure which will close valves 220 in FIG. 3, will open valves 264 in FIG. 7, and will leave valves 134 in FIG. 5 closed (for lack of exhaust gas to turbocharger 136 during startup). As the pistons in left hand cylinder pair 162 thereafter move towards their TDC position, the air pressure in their respective crankcase will fall below ambient pressure which will open valves 220 in FIG. 3 drawing air into the respective crankcase, will close valves 264 in FIG. 7, and will leave valves 134 in FIG. 5 closed (again, for lack of exhaust gas to turbocharger 136 during startup).

It is therefore seen, by having separate crankcases for cylinder pairs 161, 162 as wells as separate crankcase inlet valves 156, 220 and outlet valves 266, 264, respectively, for these cylinder pairs, that each cylinder pair 161, 162 acts like a pump during startup to increase the air pressure in plenum chamber 201 which plenum chamber is common to both cylinder pairs. This air pressure in plenum chamber 201 is then used to force air into the intake ports 110 of the cylinders during startup. Use of this common plenum chamber 201 thus advantageously allows all of the cylinders in engine 200 to assist each other in receiving startup air pressure.

As startup progresses and engine 200 begins producing exhaust gas, turbocharger 136 becomes operational and begins producings output air pressure which is supplied to plenum chamber 201 via hose 138 and valves 134. As startup is completed, the air pressure from turbocharger 136 exceeds the air pressure in plenum chamber 201 produced by the separate crankcases and supplied via valves 266 and 264 so that valves 266 and 264 close, as do valves 156 and 220. Engine 200 is now running on pressurized air supplied by turbocharger 136.

As with engine 100 in FIG. 2, it is preferable to integrally form the cylinder heads, cylinders, water jackets and the upper portion 145 of crankcase 144 of engine 200 in FIG. 3 through 7 from the same material, preferably by casting all of these components in the same mold. By making each of these components in one piece, a substantial weight savings is again realized since there is no need for any heavy bolts to hold the components together, no need for gaskets to seal the spaces between the components, and no need for broader (and heavier) facings between components which are otherwise typically used to trap and compress the gasket.

In integrally forming the upper portion of the crankcase with the other cylinder and cylinder head components, it is preferable to form about half of the crankcase with these other components. In other words, if the circular portion of the main bearings are thought to subtend an arc of 360 degrees, then the upper portion of the crankcase (where it joins with the lower portion of the crankcase) should fall roughly along a line which would divide the 360 arc into two 180 degree arcs. Alternative, the upper portion 145 of the crankcase should fit against the lower portion 146 of the crankcase in approximately the same plane.

In practice, it has been found preferable to design engines of the present invention to operate with a scavenge ratio of about 1.2 or 1.3 to 1.0. The "scavenge ratio" or "excess air ratio" is the ratio of the total volume of air pushed into a cylinder through the intake ports as compared to the total volume of the cylinder. It is desirable to have some excess air to insure that the exhaust gases are sufficiently removed from the cylinder before the next combustion cycle. Too much excess air is not desirable, however, because it is not needed to sufficiently clear the cylinder and so would otherwise require unnecessary work from the turbocharger and, perhaps, an unnecessarily large turbocharger. Further, by timely injecting the fuel through the top of the cylinder, such excess air does not waste any fuel by blowing it out the exhaust ports.

Another design consideration with piston ported two stroke cycle engines as shown, for example, in FIG. 2 is that the exhaust ports 112 should extend farther up the cylinder 106 than the intake ports 110. The reason is that this allows the exhaust ports 112 to open before the intake ports 110 and so the initial discharge of the exhaust gases naturally occurs through the exhaust ports. As a result of this port design, the preferable method for supercharging the cylinder is through backpressure in exhaust line 142. Thus, if during operation of engine 100, turbocharger 136 provides 25 psi in plenum chamber 122 and the backpressure in exhaust line 142 is 17 psi, cylinder 106 will be supercharged during each combustion cycle to 17 psi. Other pressures can also be used within the scope of the invention. Of course, exhaust line 142 must be sufficiently sturdy to withstand whatever operating pressure it will need to carry.

Another design consideration with the present invention, e.g. engine 100 in FIG. 2, is that the startup pressure in plenum chamber 122 will be desirably greater given a lesser internal volume of crankcase 145. Accordingly, form fitting components should be used where possible within crankcase 145, such as for crankshaft 150, as understood by those skilled in the art. Similarly, a dry sump construction with a pressurized oil lubrication system will likewise cut down on the internal volume of crankcase 145 while still insuring proper lubrication of engine 100. The dry sump construction is also preferable for use in airplanes where the orientation of the engine during flight can dramatically vary. A smaller plenum design will likewise desirably increase startup pressures in the plenum. In a prototype of the present invention shown in FIG. 3, the ratio of the crankcase volume (with all pistons simultaneously at their TDC position—an inoperable condition) to the total cubic inch displacement of the cylinders was about 2.7 to 1. This ratio has proved to be effective. Other ratios are also contemplated within the scope of the present invention.

Another design consideration when an engine of the present invention is to be used in an aircraft is that valves such as valves 156, 220, 264 and 266 shown, for example, in FIGS. 3 and 7 may fail during operation of the engine. The failure of one of these valves during operation would cause a loss of pressure from turbocharger 136 into plenum chamber 201 which would, in turn, cause some loss of power output by the engine. This situation can be accounted for in several ways. First, care should be taken to avoid using an excess number of valves so that the magnitude of the possible air loss in the event of a valve failure is minimized. Second, the air passage from the outside air, through the crankcase and into the plenum chamber should be sufficiently restrictive so as not to allow for a substantial loss of air pressure in the plenum chamber even in the event of a valve failure. Finally, closeable mechanical covers of sturdy construction can be installed over the valves. During startup, the covers would be opened to allow the valves to operate in the manner described above. During operation after startup of the engine, the covers would be closed so as to avoid any air pressure loss in the plenum chamber, even in the event of complete valve failure.

Those skilled in the art will recognize that it is within the scope of the present invention to provide a kit for retrofitting an existing two stroke cycle engine to practice the invention. Such a kit could include an intake valve (such as valve 156 in FIG. 2), an output valve (such as valve 132 in FIG. 2), and an air compressor valve (such as valve 134 in FIG. 2).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A two stroke cycle engine having an intake port for passing air into a cylinder of the engine, the engine having a piston within the cylinder for reciprocal movement between a top dead center position and a bottom dead center position, the engine comprising:

a crankcase;

an intake valve in a wall of the crankcase;

a plenum chamber for supplying air to the intake port;

an output valve positioned between the crankcase and the plenum chamber;

an air compressor; and an air compressor valve positioned between the air compressor and the plenum chamber;

wherein the engine has a first mode of operation during startup wherein the piston draws air into the crankcase through the intake valve as the piston moves towards its top dead center position and wherein the piston forces air from the crankcase, through the output valve, into the plenum chamber and to the intake port as the piston moves towards its bottom dead center postion;

wherein the engine has a second mode of operation during which the engine is running wherein the air compressor forces air through the air compressor valve, into the plenum chamber and to the intake port.

2. The engine of claim 1 comprising a plurality of cylinders in a V formation and wherein the plenum chamber is positioned within the V formation between the cylinders.

3. The engine of claim 1:

wherein the crankcase comprises a first crankcase chamber and a second crankcase chamber;

wherein the cylinder comprises a first cylinder coupled to the first crankcase chamber and a second cylinder coupled to the second crankcase chamber;

wherein the output valve comprises a first output valve positioned between the first crankcase chamber and the plenum chamber, and a second output valve positioned between the second crankcase chamber and the plenum chamber.

4. The engine of claim 1 wherein the intake valve and the output valve each comprise a one way valve.

5. The engine of claim 1 wherein the intake valve and the output valve each comprise a reed valve.

6. The engine of claim 1 wherein the air compressor comprises a turbocharger.

7. The engine of claim 1 wherein the air compressor comprises a supercharger.

8. A kit for retrofitting a two stroke cycle engine to allow the engine to startup without use of a startup air compressor, the engine having an intake port for passing air into a cylinder of the engine and having a piston within the cylinder for reciprocal movement between a top dead center position and a bottom dead center position, the engine further having a run-time air compressor and a plenum chamber for supplying air from the air compressor to the intake port, the engine also having a crankcase, the kit comprising:

- an intake valve adapted for use in a wall of the crankcase to allow air to pass into the crankcase during startup of the engine as the piston moves towards its top dead center position;
- an output valve adapted for use between the crankcase and the plenum chamber to allow air to pass from the crankcase into the plenum chamber during startup of the engine as the piston moves towards its bottom dead center position; and
- an air compressor valve adapted for use between the run-time air compressor and the plenum chamber to allow air to pass from the run-time air compressor into the plenum chamber while the engine is running.

9. The engine of claim 8 wherein the intake valve and the output valve each comprise a one way valve.

10. The engine of claim 8 wherein the intake valve and the output valve each comprise a reed valve.

11. A two stroke cycle engine having an intake port for passing air into a cylinder of the engine, the engine having a piston within the cylinder for reciprocal movement between a top dead center position and a bottom dead center position, the engine comprising:

- a crankcase;
- a one way intake valve in a wall of the crankcase;
- a plenum chamber for supplying air to the intake port;
- a one way output valve positioned between the crankcase and the plenum chamber;
- an air compressor; and
- a one way air compressor valve positioned between the air compressor and the plenum chamber.

12. The engine of claim 11 wherein the one way intake valve, the one way output valve and the one way air compressor valve each comprise a reed valve.

13. The engine of claim 11 wherein the air compressor comprises a turbocharger.

14. The engine of claim 11 wherein the air compressor comprises a supercharger.

15. A method of retrofitting a two stroke cycle engine to allow the engine to startup without use of a startup air compressor, the engine having an intake port for passing air into a cylinder of the engine and having a piston within the cylinder for reciprocal movement between a top dead center position and a bottom dead center position, the engine further having a run-time air compressor and a plenum chamber for supplying air from the air compressor to the intake port, the engine also having a crankcase, the method comprising the steps of:

- providing an intake valve in a wall of the crankcase to allow air to pass into the crankcase during startup of the engine as the piston moves towards its top dead center position;
- providing an output valve between the crankcase and the plenum chamber to allow air to pass from the crankcase into the plenum chamber during startup of the engine as the piston moves towards its bottom dead center position; and
- providing an air compressor valve between the run-time air compressor and the plenum chamber to allow air to pass from the run-time air compressor into the plenum chamber while the engine is running.

* * * * *